(12) United States Patent
Mahdi

(10) Patent No.: US 9,854,421 B2
(45) Date of Patent: *Dec. 26, 2017

(54) TRANSFER OF EMERGENCY SERVICES SESSION BETWEEN DISPARATE SUBSYSTEMS

(71) Applicant: Apple Inc., Cupertino, CA (US)

(72) Inventor: Kaniz Mahdi, Carrollton, TX (US)

(73) Assignee: Apple Inc., Cupertino, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/006,675

(22) Filed: Jan. 26, 2016

(65) Prior Publication Data

US 2016/0142896 A1 May 19, 2016

Related U.S. Application Data

(63) Continuation of application No. 13/675,788, filed on Nov. 13, 2012, now Pat. No. 9,277,383, which is a
(Continued)

(51) Int. Cl.
*H04W 4/22* (2009.01)
*H04W 36/00* (2009.01)
(Continued)

(52) U.S. Cl.
CPC ............. *H04W 4/22* (2013.01); *H04L 67/148* (2013.01); *H04W 4/025* (2013.01); *H04W 4/16* (2013.01);
(Continued)

(58) Field of Classification Search
CPC ... H04W 36/0022; H04W 4/025; H04W 4/22; H04L 67/148; H04L 65/1016; H04L 65/40
See application file for complete search history.

(56) References Cited

U.S. PATENT DOCUMENTS 6,044,267 A 3/2000 Foladare et al.
6,067,453 A 5/2000 Adiwoso et al.
(Continued)

FOREIGN PATENT DOCUMENTS

WO 0103459 A1 1/2001

OTHER PUBLICATIONS

3GPP TS 23.206 V0.3.0, 3rd Generation Partnership Project, "Technical Specification Group Services and System Aspects: Voice Call Continuity between CS and IMS", Stage 2 (release 7), Feb. 2006, p. 17, 6.4.1.3, p. 18, 6.4.1.3.
(Continued)

*Primary Examiner* — Omer S Mian
(74) *Attorney, Agent, or Firm* — Meyertons, Hood, Kivlin, Kowert & Goetzel, P.C.

(57) ABSTRACT

Methods and nodes for coordinating communication sessions are described herein. A method includes providing, by a control system, a signaling anchor point at a domain transfer function in a visited multimedia subsystem for an access signaling leg and a remote access signaling leg for a communication session between a user element and a public service access point and coordinating call signaling for the communication session via the access signaling leg and the remote signaling leg.

20 Claims, 11 Drawing Sheets

Related U.S. Application Data continuation of application No. 11/760,199, filed on Jun. 8, 2007, now Pat. No. 8,331,961.

(60) Provisional application No. 60/812,814, filed on Jun. 12, 2006.

(51) Int. Cl.
*H04L 29/08* (2006.01)
*H04W 4/02* (2009.01)
*H04W 4/16* (2009.01)
*H04W 76/00* (2009.01)

(52) U.S. Cl.
CPC ..... *H04W 36/0022* (2013.01); *H04W 76/007* (2013.01)

(56) References Cited

U.S. PATENT DOCUMENTS

| | | | |
|---|---|---|---|
| 6,208,627 B1 | 3/2001 | Menon et al. | |
| 6,721,565 B1 | 4/2004 | Ejzak et al. | |
| 6,961,774 B1 | 11/2005 | Shannon et al. | |
| 8,340,626 B2* | 12/2012 | Edge | H04M 7/0078 455/404.1 |
| 8,694,008 B2 | 4/2014 | Bonner | |
| 9,717,023 B2* | 7/2017 | Keller | H04W 36/0022 |
| 2003/0027569 A1 | 2/2003 | Ejzak | |
| 2003/0174688 A1 | 9/2003 | Ahmed et al. | |
| 2004/0243720 A1 | 12/2004 | Haumont et al. | |
| 2004/0249887 A1 | 12/2004 | Garcia-Martin et al. | |
| 2005/0002407 A1 | 1/2005 | Shaheen et al. | |
| 2005/0003797 A1 | 1/2005 | Baldwin | |
| 2005/0213716 A1 | 9/2005 | Zhu et al. | |
| 2005/0286531 A1 | 12/2005 | Tuohino et al. | |
| 2006/0072549 A1 | 4/2006 | Goldman et al. | |
| 2006/0083199 A1 | 4/2006 | Yang | |
| 2007/0014281 A1 | 1/2007 | Kant | |
| 2007/0091812 A1 | 4/2007 | Marathe et al. | |
| 2007/0100981 A1 | 5/2007 | Adamczyk et al. | |
| 2007/0149166 A1 | 6/2007 | Turcotte et al. | |
| 2007/0201623 A1* | 8/2007 | Hines | H04Q 3/72 379/37 |
| 2008/0305792 A1* | 12/2008 | Khetawat | H04W 88/12 455/435.1 |
| 2010/0124897 A1 | 5/2010 | Edge | |

OTHER PUBLICATIONS

International Search Report for International Application No. PCT/182006/001564, dated Nov. 14, 2006.
International Search Report for International Application No. PCT/182006/002282, dated Feb. 2, 2007.
3GPP TS 23.206 V0.40, Apr. 2006, "3rd Generation Partnership Project: Technical Specification Group Services and System Aspects; Voice Call Continuity between CS and IMS", stage 2, release 7.
3GPP TS 23.167 V7.00, Published Mar. 2006.

* cited by examiner

TRANSFER OF EMERGENCY SERVICES SESSION BETWEEN DISPARATE SUBSYSTEMS

This application is a continuation of U.S. application Ser. No. 13/675,788, entitled "TRANSFER OF EMERGENCY SERVICES SESSION BETWEEN DISPARATE SUBSYSTEMS", filed Nov. 13, 2012, which is a continuation of U.S. application Ser. No. 11/760,199, of the same title, filed Jun. 8, 2007, now U.S. Pat. No. 8,331,961, which claims the benefit of U.S. Provisional Patent Application No. 60/812,814, entitled "VCC FOR IMS AND CS EMERGENCY CALLS", filed Jun. 12, 2006, all of which are incorporated herein by reference in their entirety.

BACKGROUND

Field of the Invention

The present invention relates to communications, and in particular to providing a multimedia subsystem control for supporting emergency services sessions over circuit-switched subsystems and packet subsystems, as well as effecting transfers of established calls from one subsystem to another.

Description of the Related Art

Voice sessions or calls can be supported by circuit-switched and packet-based communications. In many communication environments, circuit-switched communications are provided by circuit-switched subsystems while packet communications are provided by packet subsystems. Traditionally, circuit-switched communications have been used for voice communications, and as such, access to emergency services for police, fire, and ambulance services has been provided by circuit-switched subsystems.

As voice services are being deployed over packet subsystems, there is a need to provide support for emergency services for packet subsystem users. Given the existing emergency services infrastructure in the circuit-switched subsystems, network providers are employing techniques to allow the emergency services provided in the circuit-switched subsystems to be accessed by the packet subsystem users.

In wireless communication environments, user elements are mobile, and as such, often move from one location to another. With movement, service for the user element may be transferred from one access point or base station to another within a given subsystem. Many user elements may be served by different types of subsystems, and based on the location of the user elements or a desired application, may transfer service from one type of subsystem to another.

For emergency services, it is important to maintain an emergency services session between an operator and the user element as the user element transfers from one access point or base station within a particular subsystem as well as between different subsystems. Although transfers from one access point or base station to another are handled within the given subsystem, there is a need to efficiently and effectively transfer existing emergency services sessions from one type of subsystem to another.

SUMMARY

The present invention provides session control for an emergency services session (E-session) in a multimedia subsystem (MS), such as the Internet Protocol (IP) Multimedia Subsystem (IMS) as defined by the Third Generation Partnership Project (3GPP). The MS resides in one or more packet based subsystems (PSs), and E-sessions may include emergency services calls, such as 911 calls, that are directed to a Public Services Access Point (PSAP) that supports emergency services. Session control of the E-sessions originating in a circuit-switched subsystem (CS) or the MS is provided by the visited MS and anchored at a domain transfer function (DTF), which is a service provided by a visited MS. The visited MS is the MS associated with the CS or PS that is currently serving the user element. As such, all call signaling for the E-session is passed through the DTF. The DTF enables efficient and effective subsystem transfers of the E-session between the CS and MS, while maintaining the E-session between the user element and the PSAP. The DTF may also provide to the PSAP location information bearing on the location of the user element when the E-session is established, as well as provide updated location information when transfers between the CS and MS occur.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

Figure 1:
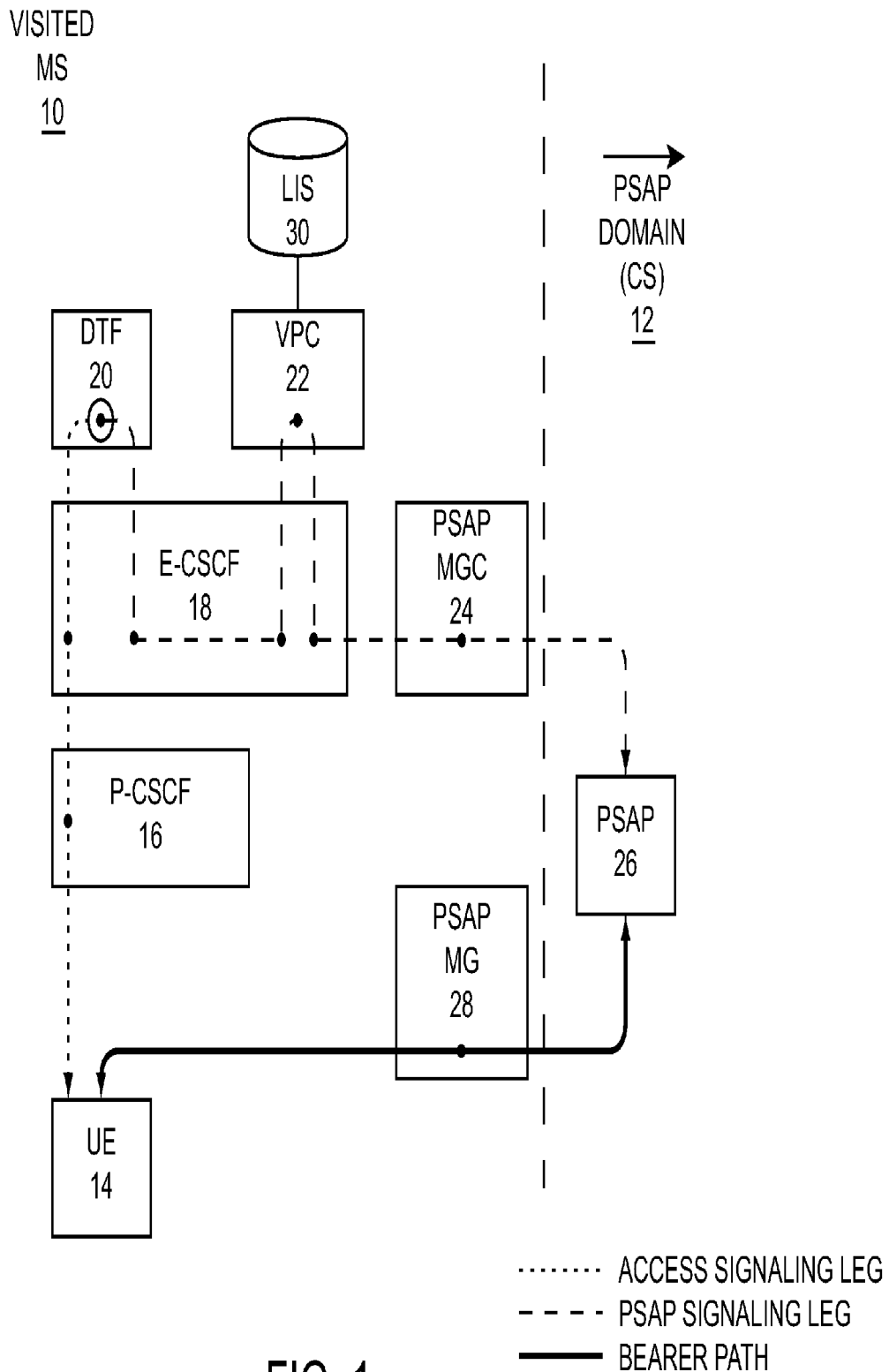
FIG. 1 is a communication environment illustrating multimedia subsystem access for a user element according to a one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides session control for an emergency services session (E-session) in a multimedia subsystem (MS), such as the Internet Protocol (IP) Multimedia Subsystem (IMS) as defined by the Third Generation Partnership Project (3GPP). The MS resides in one or more packet based subsystems (PSs), and E-sessions may include emergency services calls, such as 911 calls, that are directed to a Public Services Access Point (PSAP) that supports emergency services. Session control for E-sessions originating in a circuit-switched subsystem (CS) or the MS is provided by the visited MS and is anchored at a domain transfer function (DTF), which is a service provided by a visited MS. The visited MS is the MS associated with the CS or PS that is currently serving the user element. As such, all call signaling for the E-session is passed through the DTF. The DTF enables efficient and effective subsystem transfers of the E-session between the CS and MS, while maintaining the E-session between the user element and the PSAP. The DTF may also provide to the PSAP location information bearing on the location of the user element when the E-session is established, as well as provide updated location information when transfers between the CS and MS occur.

As an E-session is being initiated, the DTF is inserted into the signaling path of the E-sessions by an emergency call/session control function (E-CSCF) in the visited MS. The E-CSCF functions as a specially configured serving CSCF (S-CSCF) of an IMS. In general, CSCFs are often Session Initial Protocol (SIP) proxies that provide various session control functions at various points in the session signaling path. The E-CSCF provides routing and translation functions for E-sessions, and notably, invokes services including the DTF when E-sessions are being established. To act as an anchor for the signaling path of an E-session, the DTF may employ a back-to-back user agent function. As such, when the user element originates an E-session, the DTF will terminate an access signaling leg from the user element and establish a remote signaling leg toward the PSAP. Subsequently, the DTF will coordinate call signaling between the access signaling leg and the remote signaling leg for the E-session. Notably, the user element may provide location information bearing on the location of the user element for delivery to the DTF, which will pass the location information to the PSAP.

Subsystem transfers enable the user element to move back and forth between the CS and the MS while maintaining an active E-session. Subsystem transfers associated with a given E-session, including initial and subsequent subsystem transfers, are executed and controlled in the visited MS by the DTF, generally upon a transfer-specific request or a new E-session received from the user element. Upon detecting conditions requiring a transfer from one subsystem to another, the user element will establish a new access signaling leg with the DTF using an appropriate address for the DTF or an emergency address, as if a new E-session were being established. The user element may provide updated location information to the DTF when establishing the new access leg. The new access signaling leg is established via the "transferring-in" subsystem and establishment of the new access signaling leg will trigger a transfer from the "transferring-out" subsystem to the transferring-in subsystem. The DTF will implement a subsystem transfer by replacing the old access signaling leg currently communicating with the remote signaling leg with the new access signaling leg established via the transferring-in subsystem. The DTF will also send an update toward the PSAP to provide information necessary to facilitate a transfer of the bearer path to the transferring-in subsystem. The DTF may also provide a location update for the user element to the PSAP, if a location update is available. The DTF will subsequently release the old access signaling leg that was established through the "transferring-out" subsystem.

The switch of the access signaling legs from the transferring-out subsystem to the transferring-in subsystem does not impact the remote signaling leg or the application services, including the DTF, in the remote signaling leg. Using the access signaling leg in the transferring-in subsystem and the remote signaling leg, the appropriate bearer path may be established to the user element via an appropriate CS client or MS client of the user element. Since all call signaling is provided through the DTF, additional services may be associated with the call through any number of transfers.

For routing of emergency calls originating via circuit-switched subsystem and for subsystem transfers, the DTF is addressable from the different subsystems using different service identities (SI). In the CS, a subsystem transfer directory number (STN) associated with the DTF may be used for routing call signaling messages from within the CS toward the DTF in the MS. In the MS, a subsystem transfer uniform resource location (STU) associated with the DTF is used for routing call signaling messages along the access signaling leg toward the DTF. In one embodiment, the STN and the STU are provided to the user element when the E-session is being established for the first time. In the following description, 3GPP TS 24.008 (DTAP) is used in the CS, while the Session Initiation Protocol (SIP) is used in the MS to effect origination, termination, and transfer of calls. Those skilled in the art will recognize other applicable and useful protocols as substitutes for DTAP and SIP.

With reference to FIG. 1, a wireless communication environment is illustrated with a visited MS 10, and a CS-based PSAP domain 12. As depicted, a user element (UE) 14 has established an E-session via the visited MS 10 into the PSAP domain 12. The signaling path for the E-session includes an access signaling leg and a PSAP signaling leg. The access signaling leg extends from the user element 14 through a proxy-CSCF (P-CSCF) 16, an E-CSCF 18, and to a DTF 20, where the session signaling is anchored. The PSAP signaling leg extends from the DTF 20 through the E-CSCF 18, to a voice over IP (VoIP) positioning center (VPC) 22, back through the E-CSCF 18, through a PSAP media gateway controller (MGC) 24, to a PSAP 26, which is in the PSAP domain 12. Notably, the DTF 20 and the VPC 22 are applications that are closely associated with the E-CSCF 18. The bearer path for the E-session extends from the user element 14 to a PSAP media gateway (MG) 28, which is associated with the PSAP MGC 24, to the PSAP 26.

The P-CSCF 16 is typically the signaling entry point for the visited MS 10, and as such, facilitates routing of an E-session to an appropriate E-CSCF 18 in the visited MS 10. When an E-session is initiated, the E-CSCF 18 will invoke the DTF 20, effectively insert the DTF 20 in the session signaling path, and then cooperate with the DTF 20 to route the E-session toward the PSAP 26. During this routing, the E-CSCF 18 may also invoke the VPC 22, such that both the DTF 20 and the VPC 22 are inserted into the signaling path. Since the PSAP 26 is in a CS-based PSAP domain 12 in this example, the PSAP MGC 24 is employed to route the call to the PSAP 26 and establish a bearer path via the PSAP media gateway 28.

The VPC 22 helps the E-CSCF 18 to determine an appropriate PSAP 26, assuming there are multiple PSAPs 26 available. Preferably, the PSAP 26 selected for a given E-session is determined based on the location of the user element 14. Since the user element 14 may send a location reference with the initiation of an E-session, the VPC 22 will access the location reference, identify a location of the user element 14 based on the location reference, and locate an appropriate PSAP 26 to use for the E-session.

In one embodiment, the VPC 22 will determine an emergency services routing number (ESRN) for the selected PSAP 26, and a routing key associated with the E-session. The E-CSCF 18 will use the ESRN to route the E-session toward the selected PSAP 26. The routing key is used as a reference for the E-session and any contextual information associated with the E-session. The routing key is helpful in associating additional signaling or session requests associated with the E-session. Notably, a location information service (LIS) 30 may be accessible by the VPC 22 to obtain PSAP and ESRN information based on location information associated with the user element 14.

For the present invention, the DTF 20 is a new function that is closely associated with, if not integrated with, the E-CSCF 18. The DTF 20 is inserted into the signaling path when an E-session is established, such that the DTF 20 can control subsequent subsystem transfers between a CS and the visited MS 10, and in particular, a PS supporting the visited MS 10. Once an E-session is established, the DTF 20 will recognize that an E-session is active for a given user element 14. When a request for a new E-session comes in from a user element 14 that is already engaged in an active E-session with the DTF 20, the DTF 20 will effect a transfer from a transferring-out subsystem to a transferring-in subsystem from which the new E-session is being initiated. The DTF 20 will effectively associate the PSAP signaling leg, which remains intact during the transfer, with a new access signaling leg established via the transferring-in subsystem. Additionally, the DTF 20 will send an update toward the PSAP 26 to provide information regarding the new bearer path through the transferring-in subsystem, as well as updated location information associated with the user element 14.

Figure 2:
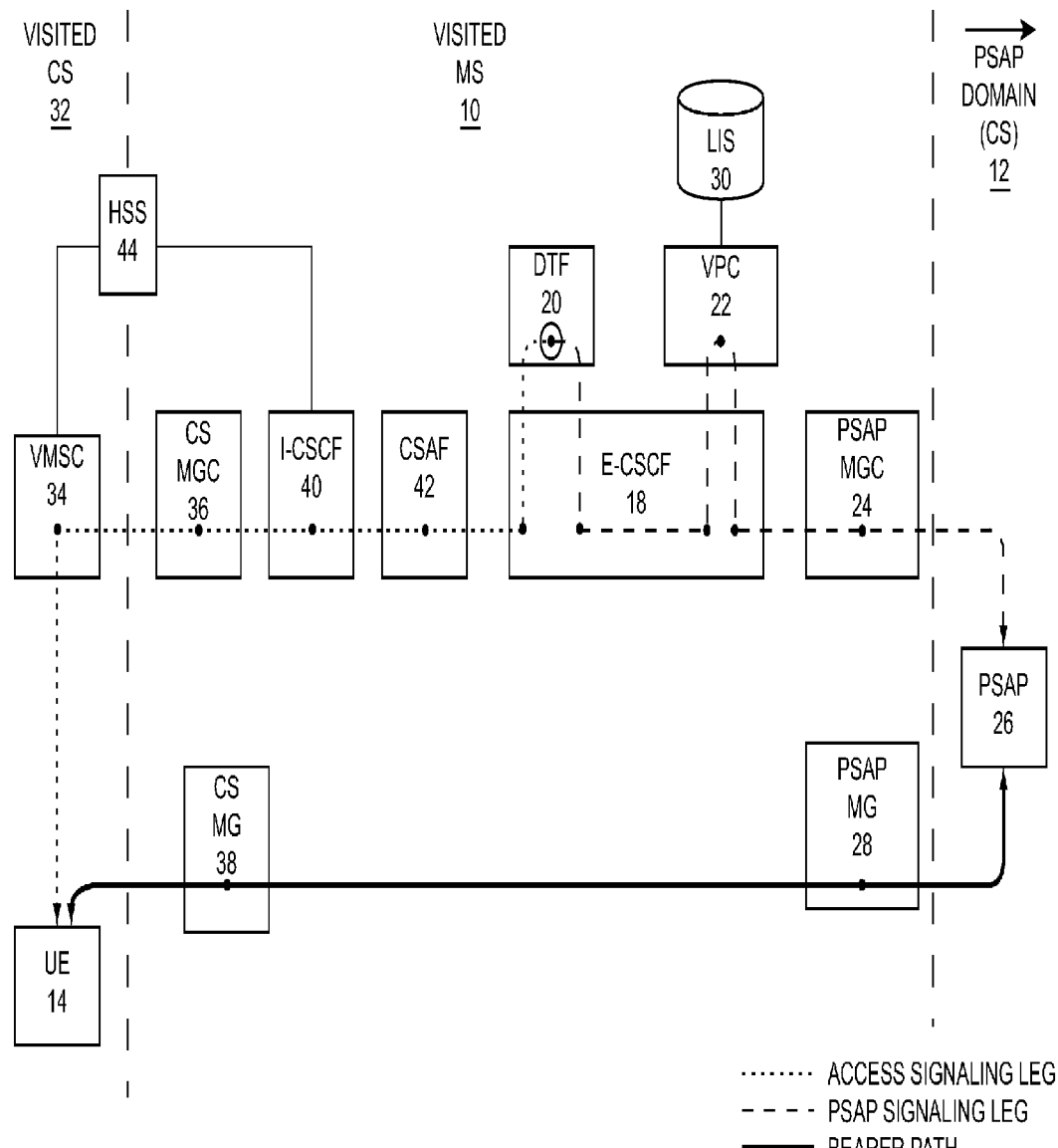
FIG. 2 is a communication environment illustrating circuit-switched subsystem access for a user element according to one embodiment of the present invention.

With reference to FIG. 2, the signaling and bearer paths are illustrated for an E-session that was initiated from the user element 14 in a visited CS 22. The access signaling leg extends from the user element 14 to the DTF 20 via a visited mobile switching center (VMSC) 34 that serves the user element 14, a CS MGC 36 that is associated with a CS media gateway (MG) 38, an interrogating CSCF (I-CSCF) 40, and a CS adaptation function (CSAF) 42. The bearer path extends from the user element 14 through the visited CS 32 to the CS MG 38. The bearer path is provided through the visited MS 10 between the CS MG 38 and the PSAP MG 28. The final section of the bearer path through the CS-based PSAP domain 12 is provided between the PSAP MG 28 and the PSAP 26.

The CS MGC 36 and the CS MG 38 cooperate to provide access between the visited CS 32 and the visited MS 10. The I-CSCF 40 initially receives the E-session and selects the CSAF 42 to use for representing the user element 14 to a selected E-CSCF 18. The CSAF 42 effectively emulates the behavior of the user element 14, if the user element 14 were served by the visited MS 10. Accordingly, the CSAF 42 provides a remote user agent function on behalf of the user element 14, when the user element 14 is served by the visited CS 32. The E-CSCF 18 will invoke the DTF 20 to anchor the access signaling and PSAP signaling legs for the E-session.

The E-CSCF 18 will also invoke the VPC 22, as described above, to help select an appropriate PSAP 26 and obtain an ESRN or other routing information necessary to allow the E-CSCF 18 to route the E-session toward the PSAP 26. In this embodiment, the E-CSCF 18 need not know whether the user element 14 is supported by the visited CS 32 or the visited MS 10, because of the CSAF 42. Notably, a home subscriber service (HSS) 44 is provided to provide routing information for the I-CSCF 40 and perhaps for the VMSC 34. In this embodiment, the I-CSCF 40 may access the HSS 44 to determine a CSAF 42 to which the E-session should be routed.

Figure 3A:
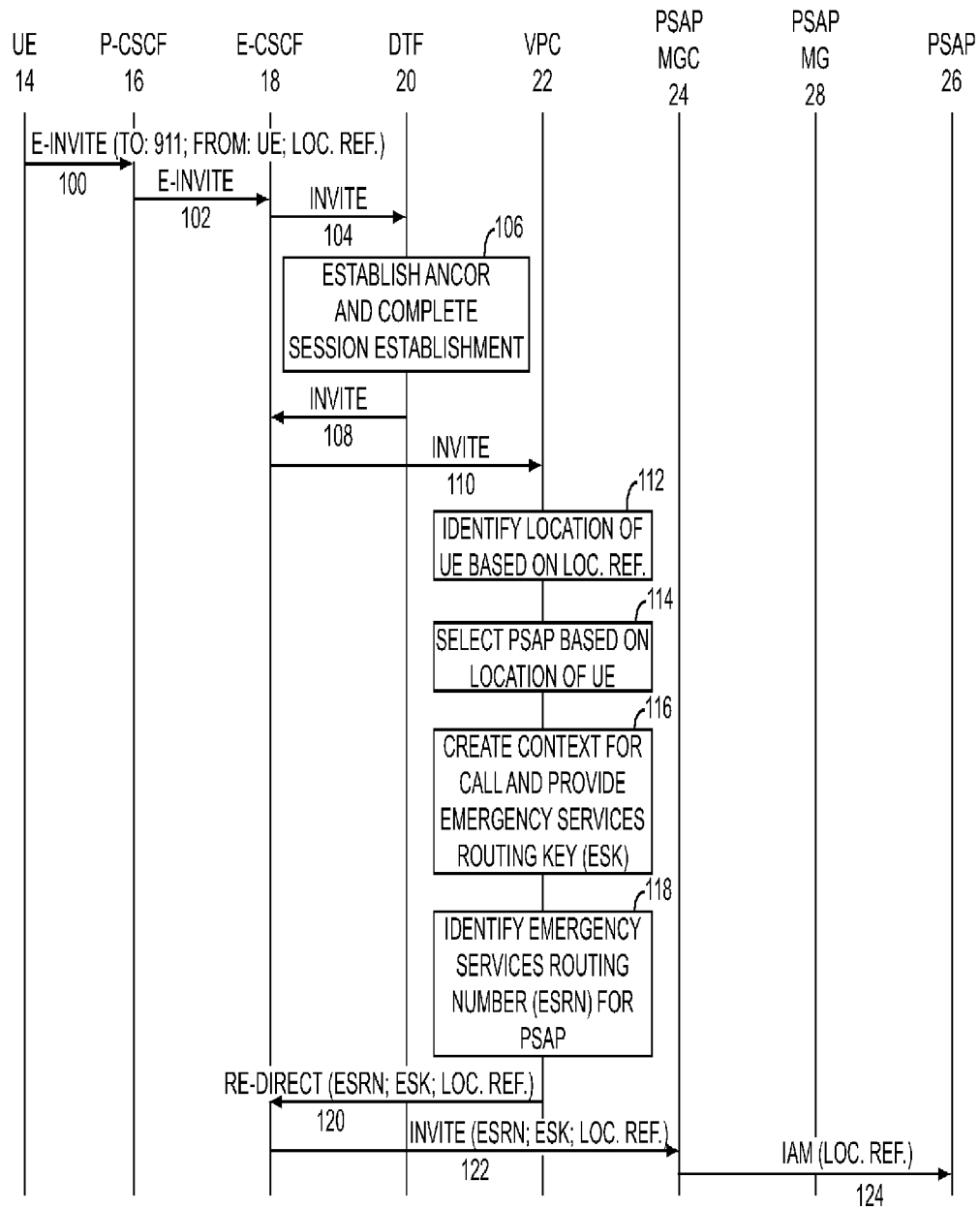
FIGS. 3A-3C depict a communication flow illustrating originating an emergency services session via a multimedia subsystem according to one embodiment of the present invention.
Figure 3B:
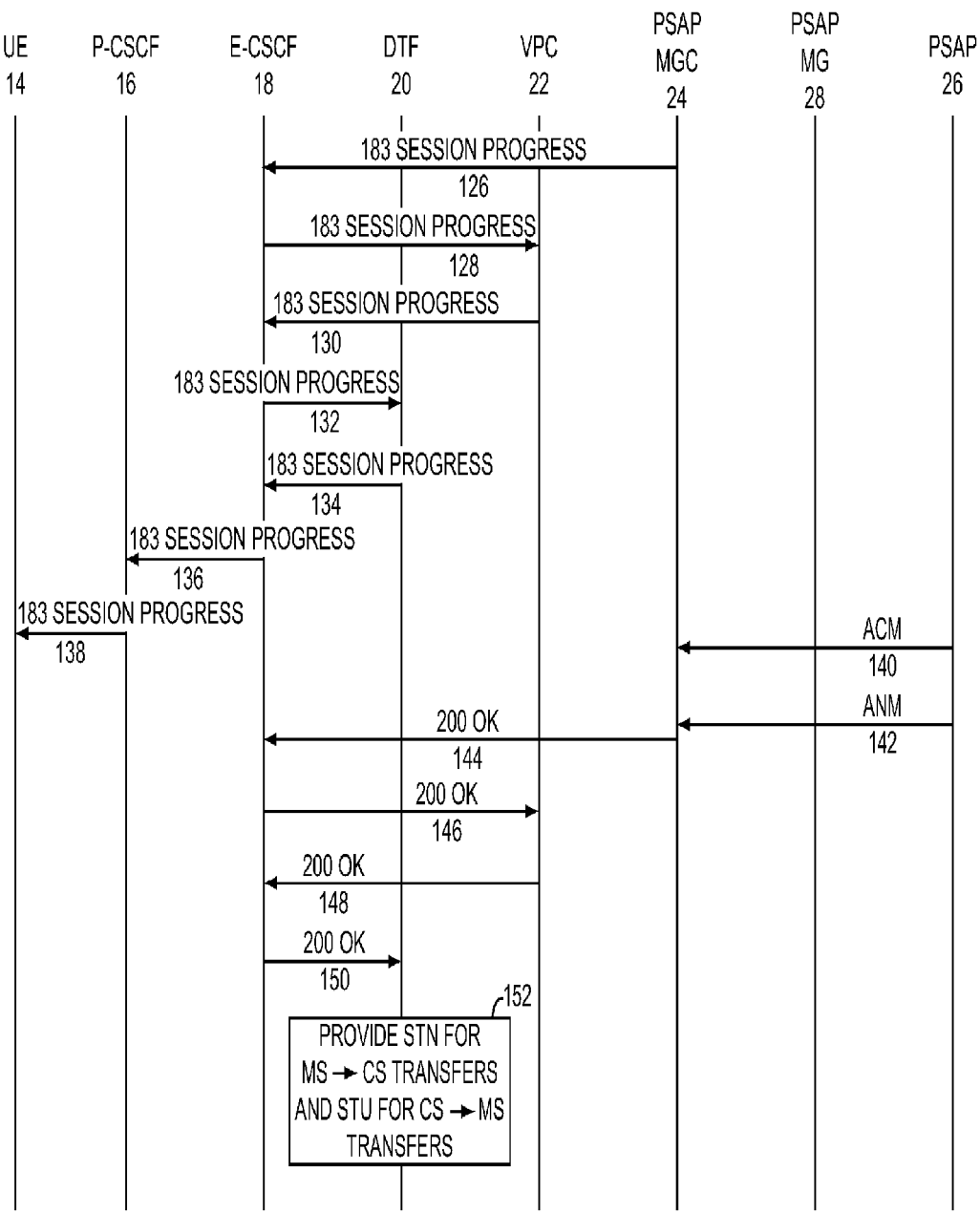
Figure 3C:
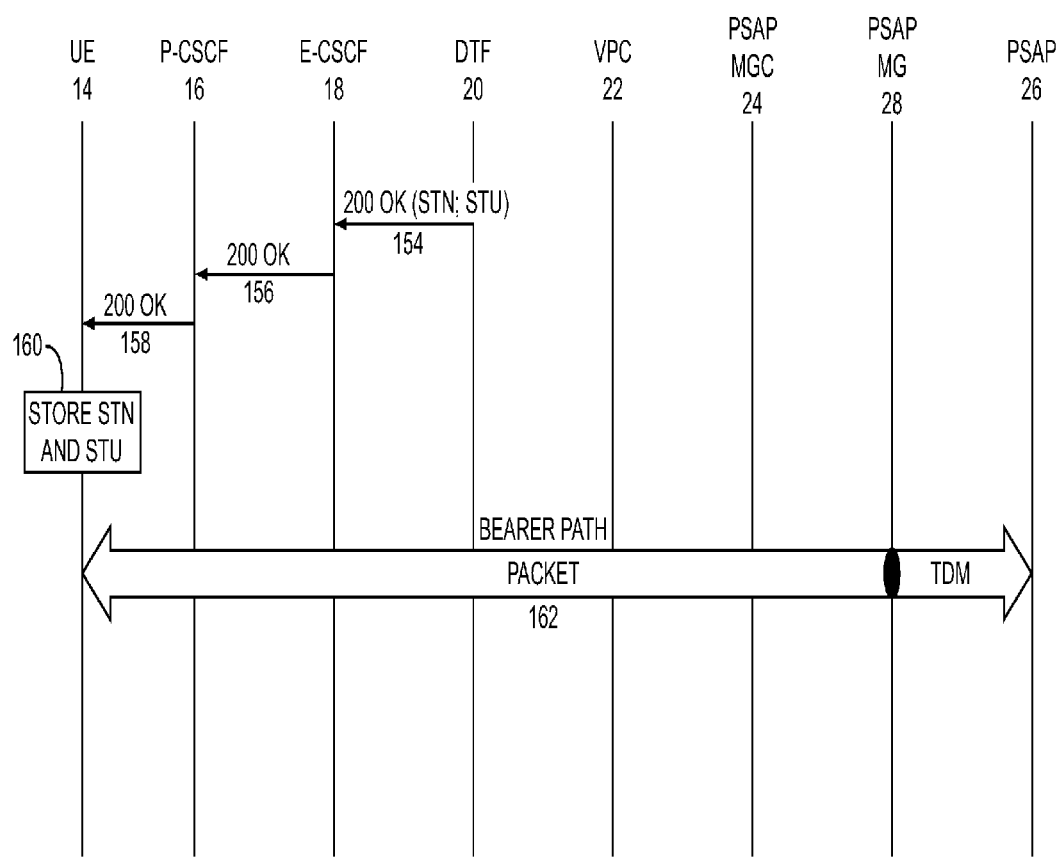

With reference to FIGS. 3A through 3C, a communication flow is provided to illustrate origination and establishment of an E-session that is originated from a user element 14 that is served by the visited MS 10 (and thus, is not being served by the visited CS 32). Assuming SIP is used for session signaling within the visited MS 10, the user element 14 may initiate an emergency Invite message (E-Invite), which is received by the P-CSCF 16 (step 100). The E-Invite may include an indication that it is an emergency session request, such as by including an emergency services number or address (911) and indicate that it is from the user element 14. The user element 14 may also include a location reference, which provides information bearing on the actual location of the user element 14. The location reference may relate to a base station, access point, network ID, or the like from which the location of the user element 14 may be derived. If the user element 14 is equipped with positioning capability, the actual position of the user element 14 may be provided as the location reference, alone or in association with the above-mentioned location indicia.

The P-CSCF 16 will select an E-CSCF 18 and send the E-Invite toward the E-CSCF 18 (step 102), which will forward an Invite to the DTF 20 (step 104). Forwarding the Invite to the DTF 20 will effectively invoke the DTF 20 as an anchor point for the signaling path for the E-session. As such, the DTF 20 will establish itself as an anchor and take the necessary steps to complete establishment of the E-session (step 106). The DTF 20 will send an Invite back to the E-CSCF 18 (step 108), which will invoke the VPC 22 by sending an Invite to the VPC 22 (step 110). The VPC 22 will identify a location of the user element 14 based on the location reference provided in the Invite (step 112), and will select a PSAP 26 based on the location of the user element 14 (step 114). As noted above, the VPC 22 may query the LIS 30 to identify the location of the user element 14 and select an appropriate PSAP 26. The VPC 22 will create a context for the call, and will provide an associated emergency services routing key (ESK) associated with the context (step 116). The context maintains a reference to the E-session and any services or information related to the user element 14, a subscriber associated with the user element 14, or services associated with the E-session. Finally, the VPC 22 will identify an emergency services routing number (ESRN) for the selected PSAP 26 (step 118).

The VPC 22 may then send to the E-CSCF 18 a Re-Direct message, which is configured to route the E-session toward the PSAP 26 (step 120). The Re-Direct message may include the emergency services routing number, the emergency services routing key, and the location reference or location derived therefrom. In response, the E-CSCF 18 will send an Invite toward the PSAP 26. In this instance, the Invite is directed to the PSAP MGC 24, which is associated with the ESRN and the PSAP 26 (step 122). In response to receiving the Invite, the PSAP MGC 24 will send an Integrated Services User Part (ISUP) Initial Address Message (IAM)

toward the PSAP 26 through the CS in which the PSAP 26 is located (step 124). The IAM will include the location reference, such that the PSAP 26 can identify the location of the user element 14.

While the E-session is being presented to the PSAP 26, the PSAP MGC 24 will send a 183 Session Progress message back toward the E-CSCF 18 to indicate that the call is being presented to the PSAP 26 (step 126). Since the session signaling path may extend through the VPC 22 and the DTF 20, the E-CSCF 18 will send the 183 Session Progress message to the VPC 22 (step 128), which will send the 183 Session Progress message back to the E-CSCF 18 (step 130). Notably, other embodiments will not keep the VPC 22 in the signaling path; however, the VPC 22 is maintained in the signaling path for the described embodiment. The E-CSCF 18 will then route the 183 Session Progress message through the DTF 20 (steps 132 and 134) and then toward the P-CSCF 16 (step 136). The P-CSCF 16 will send the 183 Session Progress message to the user element 14 (step 138), wherein the user element 14 may provide an alert to the user that the call is being presented to emergency services. During this time, assume that the E-session is processed as indicated by the providing of an ISUP Address Complete Message (ACM) back toward the PSAP MGC 24 (step 140). A corresponding SIP message may be routed back toward the user element 14 over the signaling path (not shown).

Once the E-session is answered, the PSAP 26 will send an ISUP Answer Message (ANM) toward the PSAP MGC 24 (step 142). In response to the ANM, the PSAP MGC 24 will send a 200 OK message to the E-CSCF 18 (step 144), which will route the 200 OK message through the VPC 22 (steps 146 and 148), and then to the DTF 20 (step 150). Since the E-session is anchored at the DTF 20, and the DTF 20 will control subsequent subsystem transfers, an STN for MS-to-CS transfers and an STU for CS-to-MS transfers may be provided for the user element 14 (step 152). Again, the STN is a directory number that the user element 14 may use to initiate a new access signaling leg toward the DTF 20 from within the visited CS 32. The STU is a uniform resource location (URL) that the user element 14 may use to initiate a new access signaling leg toward the DTF 20 from within the visited MS 10, or in other words, from a PS served by the visited MS 10. The DTF 20 will then forward the 200 OK message with the STN and STU to the E-CSCF 18 (step 154), which will send the 200 OK message toward the user element 14 via the P-CSCF 16 (steps 156 and 158). The user element 14 will recognize that the call has been answered upon receipt of the 200 OK message, and will extract and store the STN and the STU provided in the 200 OK message (step 160). Notably, the initial Invite may include the Session Data Protocol (SDP) information of the user element 14 to allow the PSAP MG 28 to deliver bearer traffic to the user element 14. Similarly, the 200 OK message provided by the PSAP MG 28 will provide SDP information to allow the user element 14 to deliver bearer traffic to the PSAP MG 28 to facilitate a bearer path (step 162). Notably, the bearer path between the user element 14 and the PSAP MG 28 is packet-based and supported by the underlying PS, wherein the CS-based portion of the bearer path between the PSAP MG 28 and the PSAP 26 may be a circuit-switched time division multiplexed (TDM) connection.

Figure 4A:
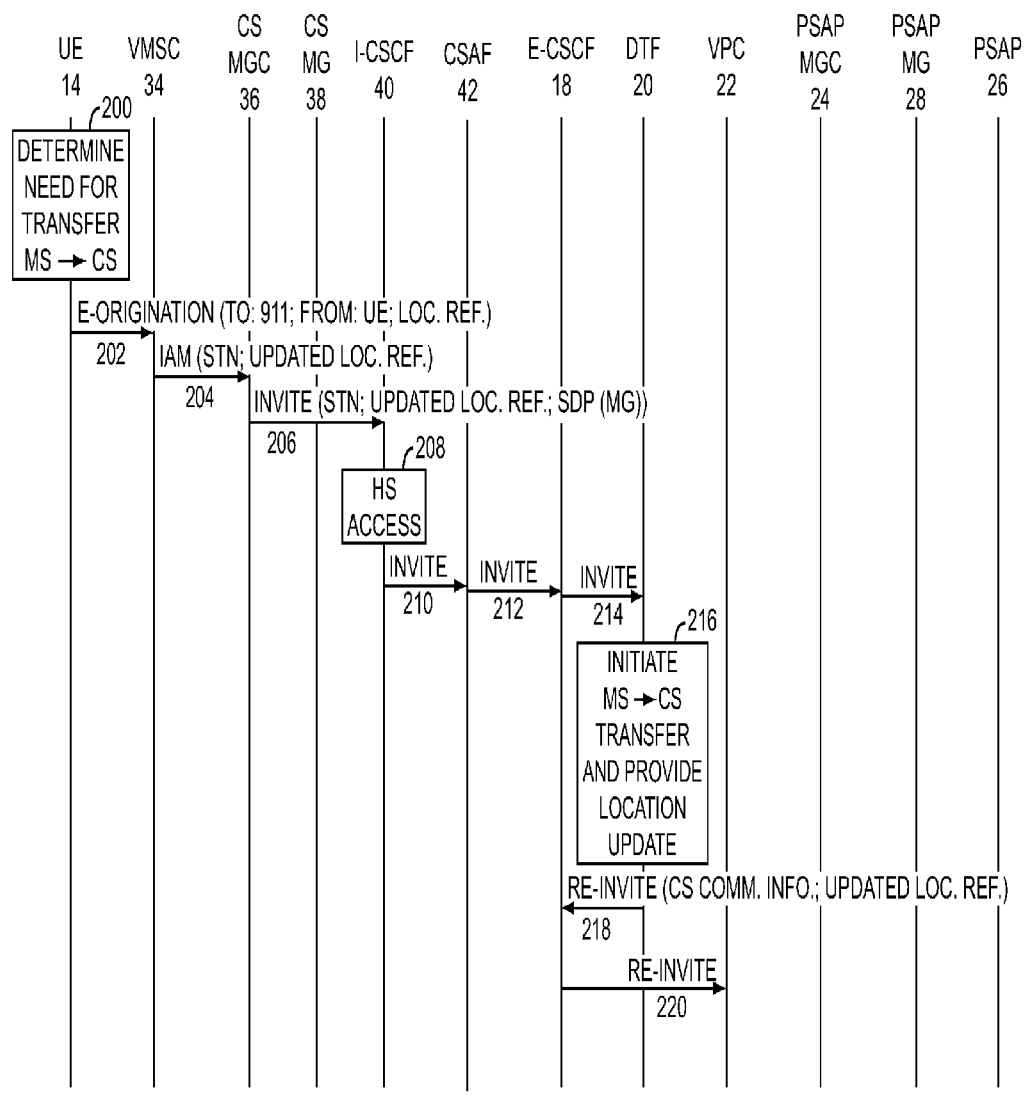
FIGS. 4A and 4B depict a communication flow illustrating the transfer of the call established in FIGS. 3A-3C to the circuit-switched subsystem according to one embodiment of the present invention.
Figure 4B:
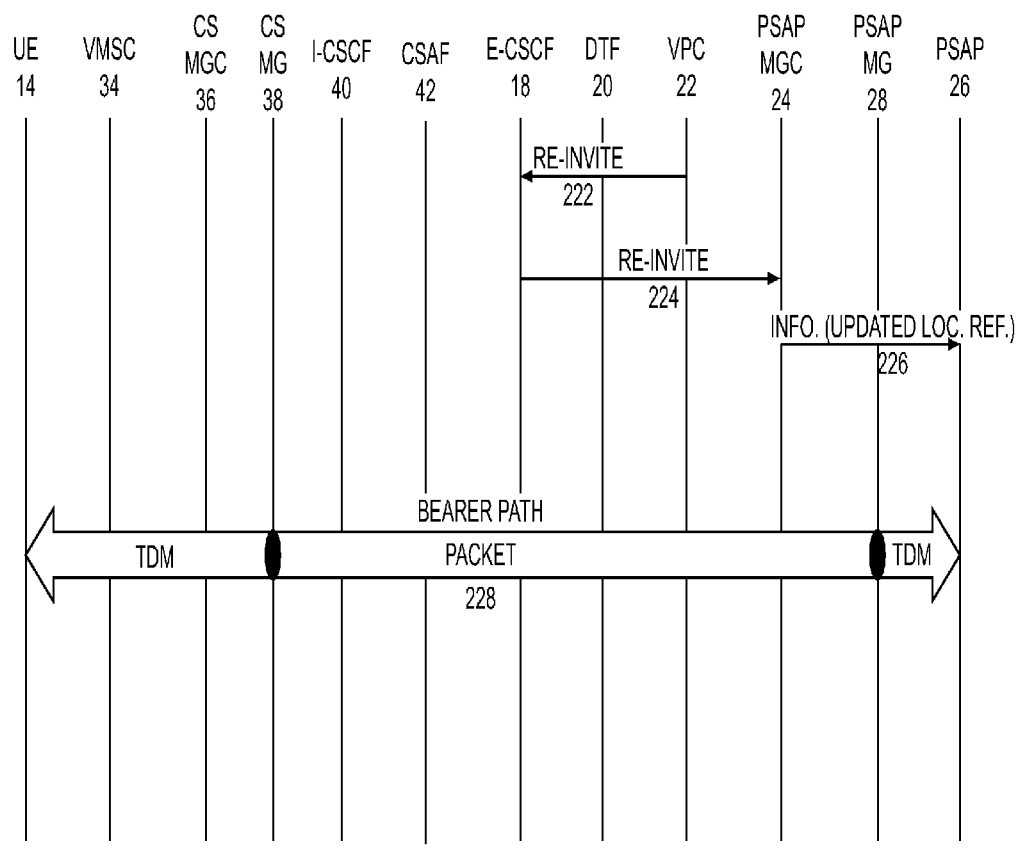

With reference to FIGS. 4A and 4B, a communication flow illustrating a subsystem transfer from the visited MS 10 to the visited CS 32 is provided. Initially, assume the user element 14 determines a need to transfer from the visited MS 10 to the visited CS 32 (step 200). Notably, the E-session established via the communication flow of FIGS. 3A through 3C is active and anchored in the DTF 20. To initiate the subsystem transfer, the user element 14 may send an emergency origination message (E-Origination) to the VMSC 34, which is serving the user element 14 (step 202). Notably, the E-Origination may include the STN and an updated location reference in case the location of the user element 14 has changed from the time the E-session was originally initiated. In response to the E-Origination message the VMSC 34 discovers the STN associated with the E-origination if one is not included by the UE and will send an ISUP IAM toward the CS MGC 36 that is associated with the STN (step 204). Notably, the ISUP IAM will include the updated location reference. The CS MGC 36 will generate an Invite, which is delivered into the visited MS 10 and received by the I-CSCF 40 (step 206). The Invite will include the STN, the updated location reference, and the SDP information associated with the CS MG 38.

The I-CSCF 40 may access the HSS 44 to identify an CSAF 42 to which the session request should be routed in light of the STN (step 208). Once the CSAF 42 has been identified, the I-CSCF 40 will forward the Invite to the CSAF 42, which is associated with the E-CSCF 18 (step 210). The CSAF 42 will act as a remote user agent on behalf of the user element 14 (for the CS access signaling leg) and forward the Invite to the E-CSCF 18 (step 212). The E-CSCF 18 will forward the Invite to the DTF 20 (step 214), which will initiate an MS-to-CS transfer and provide a location update for the PSAP 26 (step 216).

Accordingly, the DTF 20 will send a Re-Invite toward the PSAP 26 to update the communication information for the bearer path and provide the updated location reference, which was provided in the Invite or derived therefrom (step 218). The CS communication information may include the SDP of the media gateway, and any other information necessary for support of a bearer path between the PSAP MG 28 and the CS MG 38. The E-CSCF 18 will route the Re-Invite through the VPC 22 (steps 220 and 222) and on toward the PSAP MGC 24 (step 224). The PSAP MGC 24 will process the CS communication information to enable delivery of information from the PSAP 26 over a new bearer path to the CS MG 38 as well as provide information as to the updated location reference to the PSAP 26 (step 226). The call will be processed, and a 200 OK message, which is not illustrated, is propagated back toward the user element 14 along the signaling path, and will provide the SDP information of the PSAP MG 28 to the CS MGC 36 for processing by the CS MG 38. As s result, a bearer path is established between the user element 14 and the PSAP 26 via the CS MG 38 and the PSAP MG 28 (step 228). The bearer path is packet-based between the CS MG 38 and the PSAP MG 28. A TDM-based circuit-switched connection is provided between the PSAP MG 28 and the PSAP 26, as well as between the CS MG 38 and the user element 14 via the VMSC 34.

Figure 5:
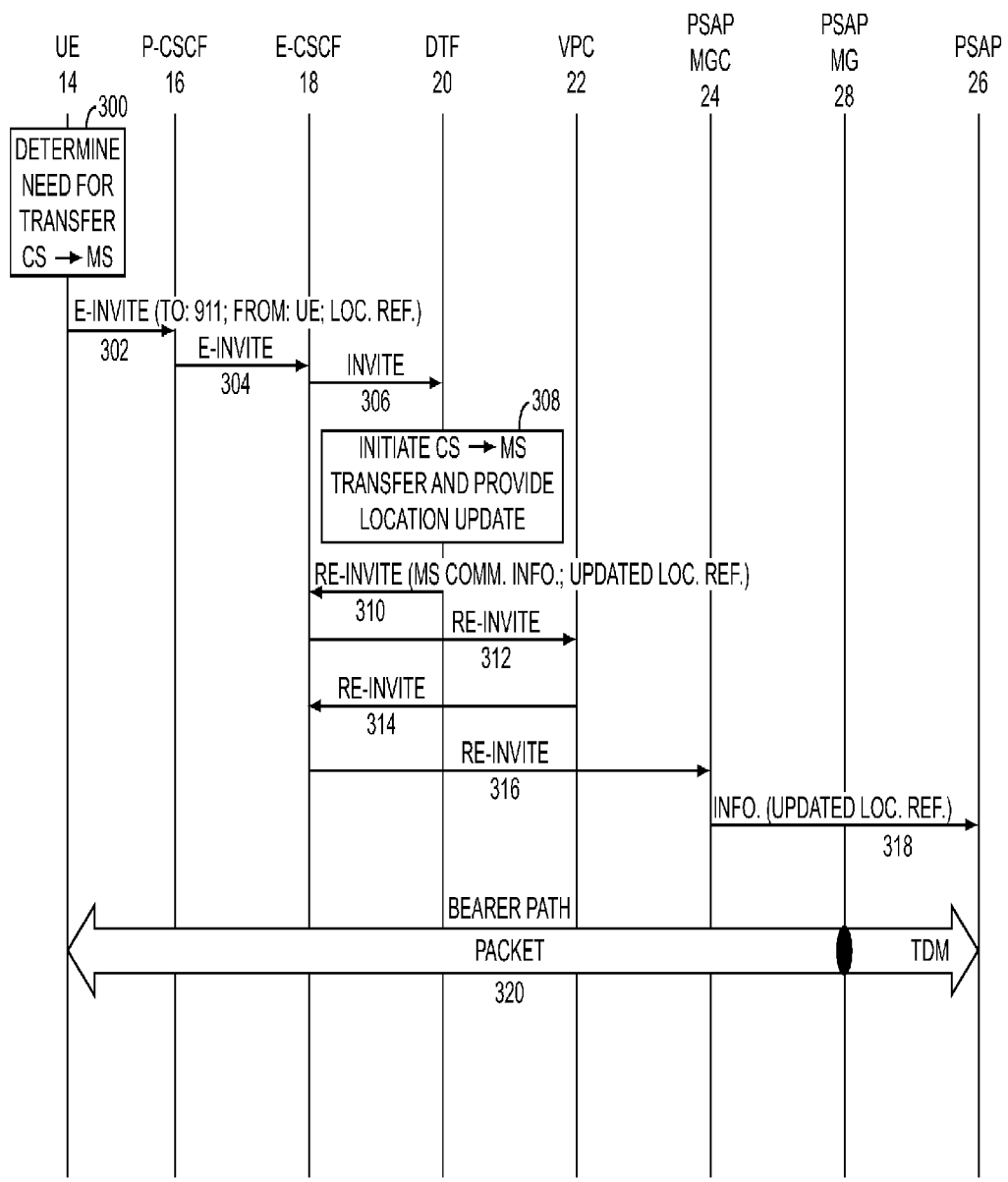
FIG. 5 is a communication flow illustrating the transfer of the call of FIGS. 4A and 4B back to the multimedia subsystem according to one embodiment of the present invention.

With reference to FIG. 5, a communication flow is provided for transferring the E-session from the visited CS 32 back to the visited MS 10. Initially, the user element 14 will determine a need to transfer from the visited CS 32 to the visited MS 10 (step 300). The user element 14 will initiate an E-Invite toward the DTF 20, potentially using the STU. The E-Invite will include an updated location reference in case the user element 14 has moved since the last transfer. The P-CSCF 16 will receive the Invite from the user element 14 (step 302), and forward the E-Invite to the E-CSCF 18 (step 304). The E-CSCF 18 will forward an Invite to the DTF 20 (step 306), which will initiate a subsystem transfer from the visited CS 32 to the visited MS 10, and provide a location update for the PSAP 26 (step 308). Accordingly, the DTF 20 will send a Re-Invite with communication information for the visited MS 10 and the updated location reference to the E-CSCF 18 (step 310). The communication information for the visited MS 10 may include the SDP information for the user element 14. The E-CSCF 18 will then route the Re-Invite through the VPC 22 (step 312 and 314), and then to the PSAP MGC 24 (step 316). The PSAP MGC 24 may send an Information message providing the updated location reference to the PSAP 26 (step 318). At this point, the PSAP MGC 24 will have access to the SDP information of the user element 14, and will ultimately provide a 200 OK message (not shown) in response to the Re-Invite back toward the user element 14 over the signaling path. In the 200 OK message, the SDP information of the PSAP MG 28 is provided to the user element 14. With the exchange of the SDP information between the user element 14 and the PSAP MG 28, the packet portion of a bearer path may be established between the user element 14 and the PSAP MG 28 (step 320). The TDM-based CS connection between the PSAP MG 28 and the PSAP 26 will remain intact and will be interworked with the packet portion of the bearer path via the PSAP MG 28.

From the above, the DTF 20 may recognize that an E-session is already established with the user element 14 in one domain when a new request for an E-session is received from the user element 14 in another domain. In response, the DTF 20 will effect a transfer to the subsystem from which the new session is being requested. In effect, the remote access leg is maintained while a new access signaling leg is established through the subsystem from which the new E-session is requested. The DTF 20 will associate the new access signaling leg with the remote access signaling leg, and release the old access signaling leg to effect the transfer from one subsystem to another. During this process, any updated location information provided by the user element 14 or associated with the user element 14 may be forwarded toward the PSAP 26 by the DTF 20.

Figure 6:
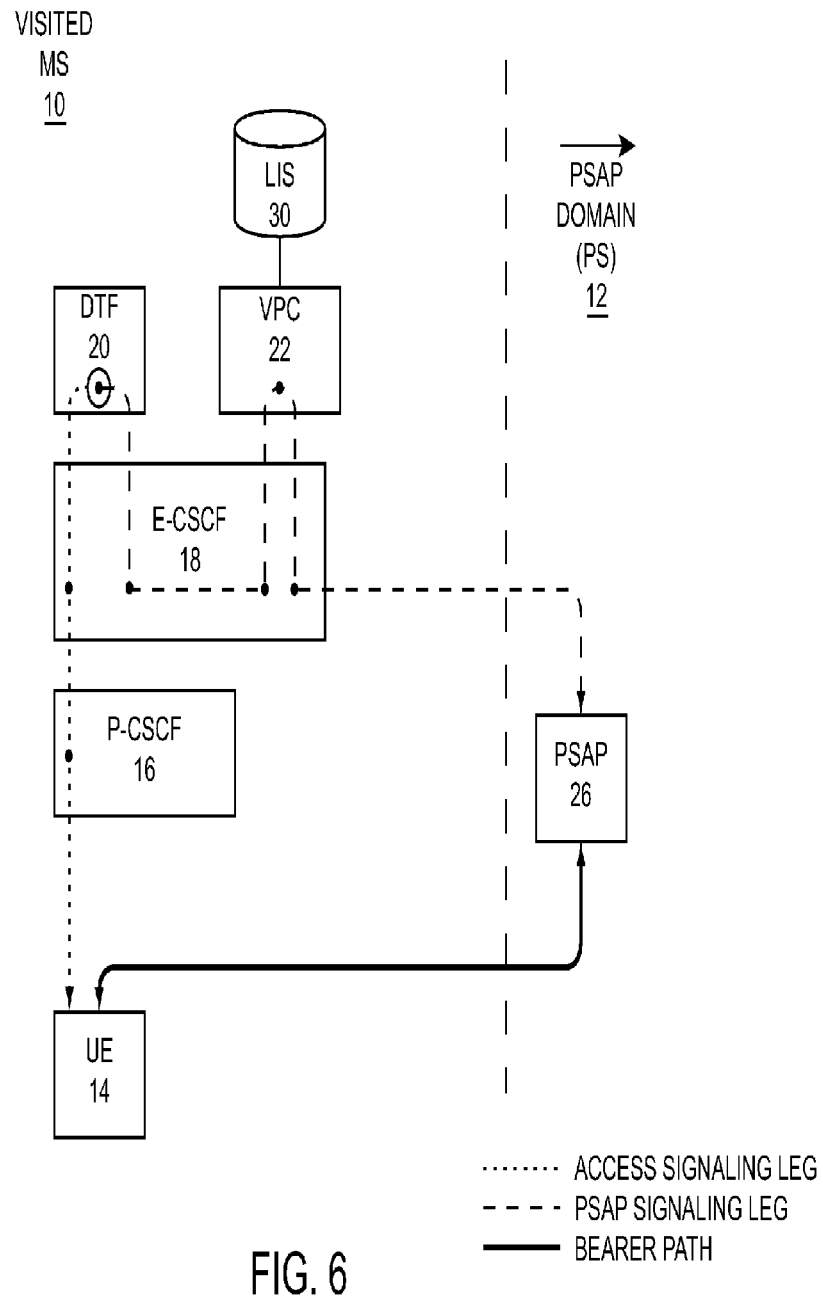
FIG. 6 is a communication environment illustrating multimedia subsystem access for a user element according to another embodiment of the present invention.
Figure 7:
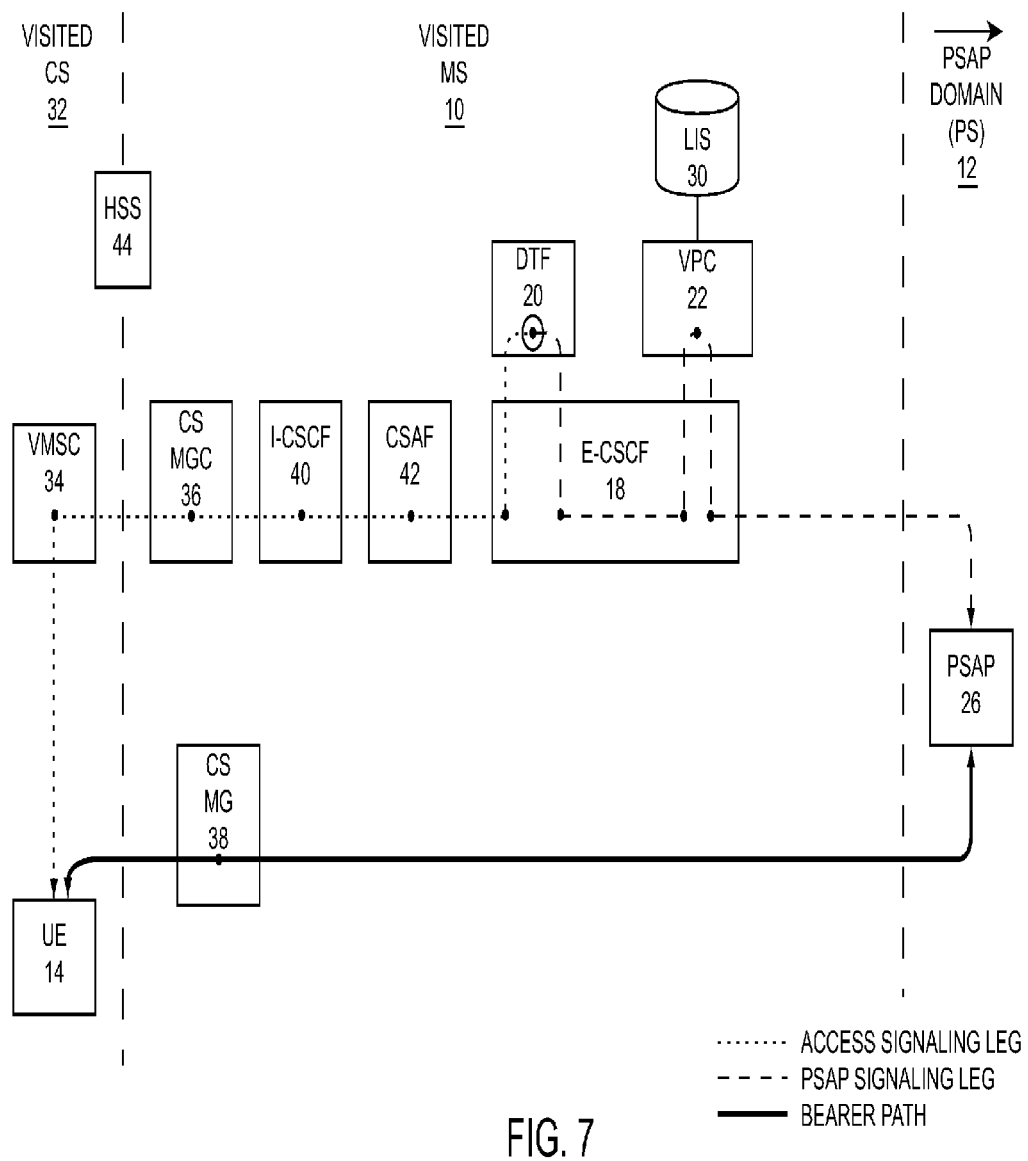
FIG. 7 is a communication environment illustrating circuit-switched subsystem access for a user element according to another embodiment of the present invention.

In the above embodiments, assume that the PSAP domain 12 and the PSAP 26 therein are served by a CS. As illustrated in FIGS. 6 and 7, the PSAP domain 12, like the visited MS 10, may be served by a PS. As such, there is no need for a media gateway, such as the PSAP MG 28, to provide interworking between the PS that supports the visited MS 10 and a CS supporting the PSAP domain 12. When the PSAP domain 12 is supported by a PS, packet-based communications may take place directly or indirectly between the E-CSCF 18 and the PSAP 26. Similarly, the bearer path may be completely packet based from the user element 14 to the PSAP 26, as illustrated in FIG. 6, or between the CS MG 38 and the PSAP 26, as illustrated in FIG. 7.

Figure 8:
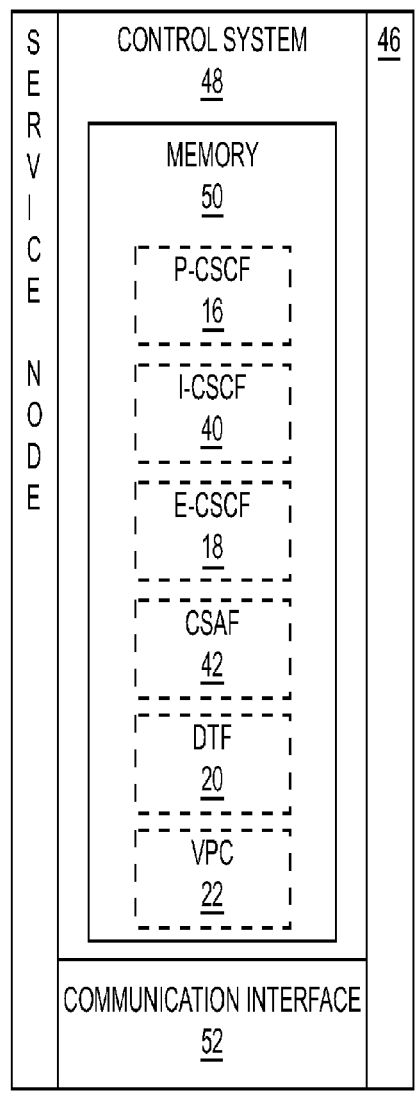
FIG. 8 is a block representation of a service node according to one embodiment of the present invention.

With reference to FIG. 8, a service node 46 is provided according to one embodiment of the present invention. The service node 46 may reside in the visited MS 10 and include a control system 48 and associated memory 50 to provide the functionality for any one or a combination of the following: the P-CSCF 16, the I-CSCF 40, the E-CSCF 18, the CSAF 42, the DTF 20, the VPC 22, or any combination thereof. The control system 48 will also be associated with a communication interface 52 to facilitate communications with any entity affiliated with the visited MS 10 or appropriately associated networks.

Figure 9:
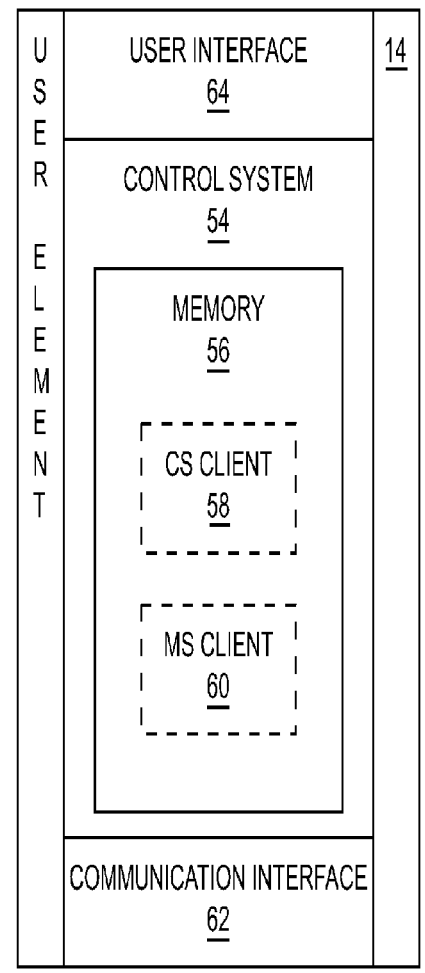
FIG. 9 is a block representation of a user element according to one embodiment of the present invention.

With reference to FIG. 9, a block representation of a user element 14 is provided. The user element 14 may include a control system 54 having sufficient memory 56 to support operation of a CS client 58 and an MS client 60, which support CS and PS communications, respectively. The control system 54 will cooperate closely with a communication interface 62 to allow the CS client 58 and the MS client 60 to facilitate communications over a CS or the PS (MS) as described above. The control system 54 may also be associated with a user interface 64, which will facilitate interaction with the user. The user interface 64 may include a microphone and speaker to facilitate voice communications with the user, as well as a keypad and display to allow the user to input and view information to support media sessions and control of the user element 14.

Those skilled in the art will recognize improvements and modifications to the preferred embodiments of the present invention. All such improvements and modifications are considered within the scope of the concepts disclosed herein and the claims that follow.

What is claimed is:

1. A method comprising:
providing, by a control system, a signaling anchor point at a domain transfer function in a multimedia subsystem for a signaling path comprising a first access signaling leg and a remote access signaling leg for an emergency services session between a user element and a public service access point (PSAP), wherein the domain transfer function is inserted in the signaling path, wherein the first access signaling leg is provided toward the user element via a transferring-out subsystem;
establishing, by the control system, the emergency services session in response to receiving a first session initiation message originating from the user element, wherein the first session initiation message includes location information for the user element;
coordinating, by the control system, call signaling for the emergency services session via the first access signaling leg and the remote signaling leg;
receiving, by the control system, a second session initiation message responsive to initiation of a new communication session via a transferring-in subsystem to effect a transfer from a transferring-out subsystem to the transferring-in subsystem, wherein the second session initiation message is routed in light of a subsystem directory transfer number associated with the domain transfer function, wherein the domain transfer function receives updated location information in the second session initiation message and sends the updated location information to the PSAP at least via a voice over internet protocol (VoIP) positioning center;
detecting, by the control system, an existence of the emergency services session with the user element when the second session initiation message is received; and
associating, by the control system, a second access signaling leg via the transferring-in subsystem with the remote access signaling leg, and releasing the first access signaling leg session in response to the detecting the existence of the emergency services session.

2. The method of claim 1, further comprising sending, by the control system, an update message on the remote leg toward the PSAP to facilitate bearer path transfer for the emergency services session.

3. The method of claim 1, further comprising establishing, by the control system, the second access signaling leg for the communication session.

4. The method of claim 1, further comprising coordinating, by the control system, call signaling exchanges for the communication session via the second access signaling leg and the remote signaling leg after the transfer to the transferring-in subsystem.

5. The method of claim 1, further comprising establishing, by the control system, the remote signaling leg for the emergency services session toward the PSAP.

6. The method of claim 1, wherein the transferring-out subsystem is a packet based subsystem, and the transferring-in subsystem is a circuit-switched subsystem.

7. The method of claim 1 further comprising selecting, by the control system, the public service access point based on the location information for the user element.

8. A non-transitory computer-readable medium storing software instructions executable by a multimedia subsystem for coordinating an emergency services session, wherein the software instructions are configured to, when executed, cause the multimedia subsystem to:
provide a signaling anchor point for a signaling path comprising a first access signaling leg and a remote access signaling leg for the emergency services session between a user element and a public service access point (PSAP), wherein a domain transfer function is inserted in the signaling path, wherein the first access signaling leg is provided toward the user element via a transferring-out subsystem;
establish the emergency services session in response to receiving a first session initiation message originating from the user element, wherein the first session initiation message includes location information for the user element;
coordinate call signaling for the emergency services session via the first access signaling leg and the remote signaling leg;
receive a second session initiation message responsive to initiation of a new communication session via a transferring-in subsystem to effect a transfer from a transferring-out subsystem to the transferring-in subsystem, wherein the second session initiation message is routed in light of a subsystem directory transfer number associated with the domain transfer function, wherein the domain transfer function receives updated location information in the second session initiation message and sends the updated location information to the PSAP at least via a voice over internet protocol (VoIP) positioning center;
detect an existence of the emergency services session with the user element when the second session initiation message is received; and
associate a second access signaling leg via the transferring-in subsystem with the remote access signaling leg, and releasing the first access signaling leg session in response to the detecting the existence of the emergency services session.

9. The non-transitory computer-readable medium of claim 8, wherein the software instructions are further configured to cause the multimedia subsystem to send an update message on the remote leg toward the PSAP to facilitate bearer path transfer for the emergency services session.

10. The non-transitory computer-readable medium of claim 8, wherein the software instructions are further configured to cause the multimedia subsystem to establish the second access signaling leg for the communication session.

11. The non-transitory computer-readable medium of claim 8, wherein the software instructions are further configured to cause the multimedia subsystem to coordinate call signaling exchanges for the communication session via the second access signaling leg and the remote signaling leg after the transfer to the transferring-in subsystem.

12. The non-transitory computer-readable medium of claim 8, wherein the software instructions are further configured to cause the multimedia subsystem to establish the remote signaling leg for the emergency services session toward the PSAP.

13. The non-transitory computer-readable medium of claim 8, wherein the transferring-out subsystem is a packet based subsystem, and the transferring-in subsystem is a circuit-switched subsystem.

14. The non-transitory computer-readable medium of claim 8, wherein the software instructions are further configured to cause the multimedia subsystem to select the public service access point based on the location information for the user element.

15. A node comprising:
a communication interface; and
a control system associated with the communication interface and configured to:
provide a signaling anchor point at a domain transfer function in a multimedia subsystem for a signaling path comprising a first access signaling leg and a remote access signaling leg for an emergency services session between a user element and a public service access point (PSAP), wherein the domain transfer function is inserted in the signaling path, wherein the first access signaling leg is provided toward the user element via a transferring-out subsystem;
establish the emergency services session in response to receiving a first session initiation message originating from the user element, wherein the first session initiation message includes location information for the user element;
coordinate call signaling for the emergency services session via the first access signaling leg and the remote signaling leg;
receive a second session initiation message responsive to initiation of a new communication session via a transferring-in subsystem to effect a transfer from a transferring-out subsystem to the transferring-in subsystem, wherein the second session initiation message is routed in light of a subsystem directory transfer number associated with the domain transfer function, wherein the domain transfer function receives updated location information in the second session initiation message and sends the updated location information to the PSAP at least via a voice over internet protocol (VoIP) positioning center;
detect an existence of the emergency services session with the user element when the second session initiation message is received; and
associate a second access signaling leg via the transferring-in subsystem with the remote access signaling leg, and releasing the first access signaling leg session in response to the detecting the existence of the emergency services session.

16. The node of claim 15, the node further configured to send an update message on the remote leg toward the PSAP to facilitate bearer path transfer for the emergency services session.

17. The node of claim 15, the node further configured to establish the second access signaling leg for the communication session.

18. The node of claim 15, the node further configured to coordinate call signaling exchanges for the communication session via the second access signaling leg and the remote signaling leg after the transfer to the transferring-in subsystem.

19. The node of claim 15, the node further configured to establish the remote signaling leg for the emergency services session toward the PSAP.

20. The node of claim 15, wherein the transferring-out subsystem is a packet based subsystem, and the transferring-in subsystem is a circuit-switched subsystem.

* * * * *